United States Patent

[11] 3,571,606

[72] Inventor Masakazu Kikuchi
Takasaki-shi, Japan

[21] Appl. No. 850,105
[22] Filed Aug. 14, 1969
[45] Patented Mar. 23, 1971
[73] Assignee Taiyo Yuden Kabushiki Kaisha
Chiyoda-ku, Tokyo, Japan
[32] Priority Aug. 15, 1968, Oct. 17, 1968
[33] Japan
[31] 43/69780 and 43/90120

[54] SATURABLE REACTOR TYPE COMPENSATING CIRCUIT APPARATUS
7 Claims, 7 Drawing Figs.

[52] U.S. Cl. ........ 307/88, 315/27, 336/110
[51] Int. Cl. ........ H03k 17/80, H01j 29/70, H01f 21/08
[50] Field of Search ........ 307/88, 104; 315/27; 336/110; 330/8; 323/56

[56] References Cited
UNITED STATES PATENTS

| | | | |
|---|---|---|---|
| 2,976,478 | 3/1961 | Aske ........ | 323/56 |
| 3,153,174 | 10/1964 | Claypool et al. ........ | 315/27 |
| 3,427,497 | 2/1969 | Gostyn ........ | 315/27 |

*Primary Examiner*—Stanley M. Urynowicz, Jr.
*Attorney*—Waters, Roditi, Schwartz & Nissen

ABSTRACT: Saturable reactor apparatus in which primary and secondary windings, respectively coupled to horizontal and vertical deflection current sources, are wound on the shaft of a ferrite core at the opposite ends of which are permanent magnets. Flux generated in the core is controlled either by adjustment of the permanent magnets or by the use of a further permanent magnet.

PATENTED MAR 2 3 1971 3,571,606
FIG. 1
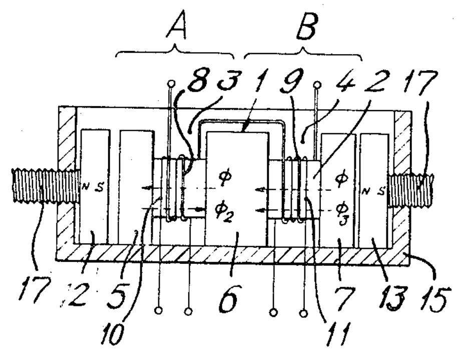
FIG. 2
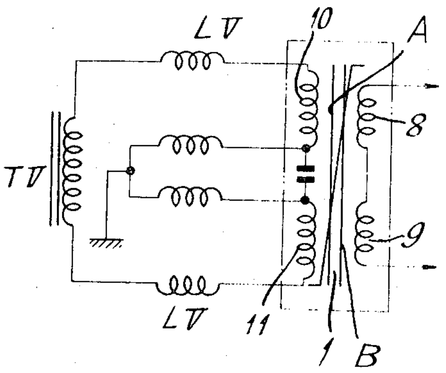
FIG. 3 FIG. 4
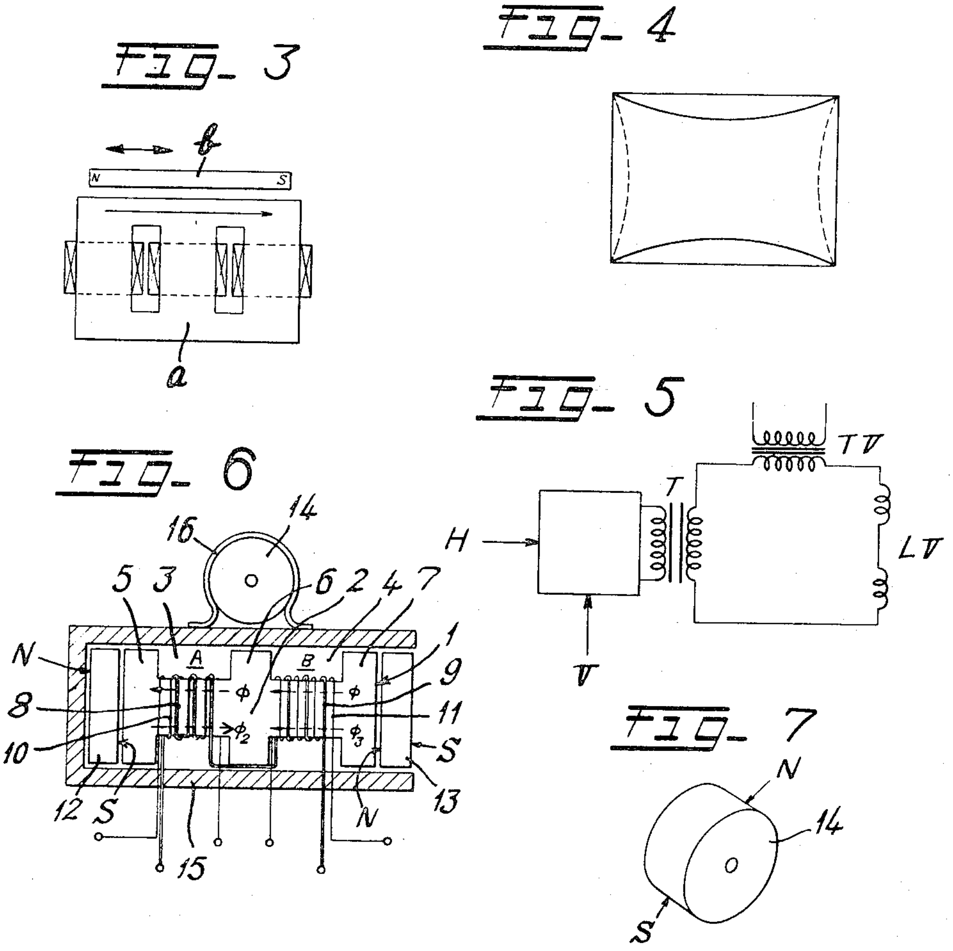
FIG. 5 FIG. 6 FIG. 7
INVENTOR
BY Masakazu Kikuchi

SATURABLE REACTOR TYPE COMPENSATING CIRCUIT APPARATUS

DRAWING

FIG. 1 is a side view of one embodiment of the invention;

FIG. 2 is a schematic diagram of a circuit using the same;

FIG. 3 is a top plan view of a well known saturable reactor apparatus;

FIG. 4 is a plan view showing top and bottom pincushion distortion and side pincushion distortion of a raster;

FIG. 5 is a schematic diagram of a circuit for compensating the top and bottom pincushion distortion;

FIG. 6 is a side view of another embodiment of the invention; and

FIG. 7 is a perspective view of a part thereof.

DETAILED DESCRIPTION OF THE INVENTION

The invention relates to a saturable reactor apparatus adapted to be used in a circuit suited for the compensation of pincushion distortion such as, for example, in a color television picture tube.

It is usual in color television picture tubes to employ deflecting coil to create a uniform magnetic field which is used to prevent aberration in convergence degree of the generated beam or in color purity. However, is such a deflecting coil is used, the raster undergoes pincushion distortion as shown in FIG. 4. This pincushion distortion is not very conspicuous in the case of 70° deflection but rapidly becomes larger in a television picture tube which is comparatively large in deflection such as with 90°, 114° and the like.

With respect to pincushion distortion, there are top and bottom pincushion distortion and side pincushion distortion. The side pincushion distortion is not as conspicuous as the top and bottom pincushion distortion and compensation of the former is not usually provided. For compensation of the top and bottom pincushion distortion, it is conventional to control, in a color television receiver, the deflecting coil electric current.

More particularly, for the compensation of top and bottom pincushion distortion, a parabolic electric current of horizontal period corresponding to the curve of the scanning line is added to the deflecting electric current for increasing said deflection current toward the negative side in the first half of the vertical scanning and toward the positive side in the second half of the vertical scanning so that the same is changed substantially linearly with its amplitude being zero in the middle thereof. For this purpose, as shown in FIG. 5, a parabolic electric voltage taken from a horizontal output circuit H is modulated by a sawtooth voltage obtained from a vertical output circuit V, so that the resultant current obtained from a compensating current output transformer T is added to a vertical deflecting current obtained from a vertical output transformer TV for application to a vertical compensating coil LV, whereby the desired compensation can be effected.

A simple apparatus hitherto used for effecting this operation is a device utilizing a magnetic saturation characteristic. Such a device is shown in FIG. 3 and comprises a coil using a closed magnetic circuit core *a* and a permanent magnet *b*. As this type of apparatus uses a closed magnetic circuit type of core of EI shape, it is good as to magnetic saturation characteristics but is so deflective that the coefficient of temperature of the magnetic saturation characteristic is comparatively large. Thus, the compensation characteristic is likely to be changed depending on the surrounding temperature. For example, the change in the voltage of the compensation current can be about 50 percent in a temperature range of −10°C to +80°C.

An object of the invention is to avoid this problem.

One embodiment of the invention is characterized in that a ferrite magnetic drum core 1 comprising a core shaft 2 having projecting flanges 5, 6 and 7 with spaces 3 and 4 formed therebetween is provided with primary windings 8 and 9 and secondary windings 10 and 11 wound within the spaces 3 and 4 in such a manner that the primary and secondary windings of each group are in closely coupled relation. At the same time, the secondary windings 10 and 11 are in opposite to one another in winding direction. Plate-form permanent magnets 12 and 13 are provided adjacent the opposite ends of said core 1 so as to be movable in the longitudinal direction of core 1.

The primary and secondary windings 8 and 10 within the space 3 constitute a coil A and the primary and secondary windings 9 and 11 within the space 4 constitute a coil B. Numeral 15 denotes an insulating material casing containing the core 1 and the permanent magnets 12 and 13. Numeral 17 denotes an adjusting screw for each magnet 12 and 13.

When this apparatus is to be used as a compensating circuit for top and bottom pincushion distortion in a television receiving circuit, the same is electrically connected in almost the same manner as in the case shown in FIG. 2. Namely, it is so connected that a horizontal deflection current flows through the primary windings 8 and 9 and a vertical deflection current flows through the secondary windings 10 and 11. In this case, there is produced within the core 1 a definite direction of magnetic flux $\Phi$, as shown by the arrows, by the action of the opposite permanent magnets 12 and 13.

In case the vertical deflection current through the secondary windings 10 and 11 is zero, that is, the scanning is at the middle position of the raster, the electric currents produced in the secondary windings 10 and 11 by the horizontal deflection current in the primary windings 8 and 9 are equal in magnitude but opposite in direction, so that the electric current produced in the current.

In case the direction of the vertical deflection current windings 10 and 11 is zero and there is no compensation output for vertical deflection.

In case the vertical deflection current becomes maximum, i.e. scanning is at the uppermost position of the raster, respective fluxes $\Phi_2$and $\Phi_3$ produced by the vertical deflection current of the secondary windings 10 and 11 become a maximum. These fluxes are opposite in direction. Accordingly, the magnitude of the total magnetic flux within the core the total flux within the core portion of the transformer B becomes a maximum, $\Phi+ \Phi_3$ and this core portion becomes saturated. In this case, the magnetic flux caused by the horizontal deflection current through windings 8 and 9 is small in comparison with the other fluxes, so that its effect upon the saturation of transformer B may be neglected. As the core portion of the transformer B is brought into a magnetically saturated condition, the inductance of the primary winding 9 thereon is lowered. Therefore, the horizontal deflection current in windings 8 and 9 produces a larger current in the secondary winding 10 than in the secondary winding 11. The difference between these currents induced in the secondary windings is added to the vertical deflection current is reversed, i.e. at the lowermost position of the raster, the core portion of the transformer A is brought into a magnetically saturated condition and a greater correction is induced into winding 11 than winding 10, and again the difference is added to the vertical deflection current. Similarly, with intermediate values of the vertical deflection current, a compensation current of the appropriate polarity and amplitude will be obtained. The horizontal deflection current is of sawtooth shape, so that the same without change cannot be used as a compensation current wave. Therefore, the same is used after being changed into a sine wave at the horizontal deflection current frequency by means of an LC circuit.

Since this invention is such that plate-form permanent magnets are provided on both sides of a drum core for inducing a magnetic flux in the longitudinal direction of said core, the induced magnetic flux is strong. Even if a core of open magnetic circuit type, which is generally more difficult to magnetically saturate, is used, the same can be easily magnetically saturated, and the magnetic saturation characteristic thereof is not inferior to that of the closed magnetic circuit type.

Though the form of the top and bottom pincushion distortion in the usual television receiver set is not always symmetrical at the top and bottom, according to this invention, two permanent magnets are designed to be moved individually so as to adjust the magnitude of the magnetic flux, whereby the pincushion distortion can be independently adjusted depending on the respective degree of distortion at the top and the bottom.

Since, in this invention, there can be used a core of open magnetic circuit type which is lower in temperature coefficient of the magnetic saturation value thereof than a closed magnetic circuit type core, change of characteristics of apparatus of the invention can be small in relation to change in temperature. It is possible that the change of the compensation current voltage is constrained to about 15 percent within the range of from −10° C. to +80° C. As, additionally, the core is a drum core of open magnetic circuit type, the winding of the coil can be easily carried out and the manufacturing cost of the apparatus can be lowered.

In a modified embodiment of this invention as illustrated in FIG. 6, the permanent magnets 12 and 13 are immovable and a circular form permanent magnet 14 having magnetic poles formed at the periphery thereof as illustrated in FIG. 7 is provided on one side of the apparatus so as to have its center shaft at right angles to the magnetic flux direction of the drum core 1 and to be rotatable. In the illustrated embodiment, the disc form permanent magnet 14 is rotatably attached to the housing 15 through a band 16.

This modified embodiment can effect almost the same operation as the first embodiment, and has additional advantages. In an ordinary television receiver set, the form of the pincushion distortion is not always symmetrical at top and bottom and adjustment thereof is needed. In this modified embodiment, by rotating adjustment of the disc form permanent magnet 14, the magnitude of the magnetic flux in the core of the coils A and B can be adjusted at a single position so as to be increased and decreased in mutually inverse relationship. Additionally, the permanent magnet can be rotated 360°, so that the range of adjustment can be wide enough. Further, the opposite permanent magnets are not movable, so that the adjustment mechanism can be made small in size and accordingly the apparatus can be small in size.

I claim:

1. Saturable reactor apparatus comprising a ferrite core including a central part and a shaft extending in opposite directions therefrom and flanges on the shaft defining spaces on opposite sides of the central part, primary and secondary windings on the shaft in each of said spaces and in close coupling relationship, the secondary windings being oppositely wound, permanent magnets at opposite ends of the shaft to generate flux in said core, and means to control the thusly generated flux.

2. Apparatus as claimed in claim 1 wherein said means includes means to vary the position of the permanent magnets relative to said shaft.

3. Apparatus as claimed in claim 1 wherein said means includes a further permanent magnet adjacent the core and rotatable about an axis perpendicular to said shaft.

4. Apparatus as claimed in claim 1 wherein said magnets are of plate-form.

5. Apparatus as claimed in claim 1 comprising horizontal and vertical deflection deflection television-receiver circuits generating horizontal and vertical deflection currents, and means for respectively coupling the currents to said primary and secondary windings.

6. Apparatus as claimed in claim 3 wherein said further magnet is of circular form and has peripheral magnetic poles therein.

7. Apparatus as claimed in claim 2 wherein the latter said means includes threaded rods.